United States Patent
Bochart et al.

(10) Patent No.: US 11,939,904 B2
(45) Date of Patent: Mar. 26, 2024

(54) OPTIMIZED PISTON TEMPERATURE CONTROL IN GASEOUS FUEL HYDROGEN ENGINE SYSTEM

(71) Applicant: Caterpillar Inc., Peoria, IL (US)

(72) Inventors: Michael R Bochart, Washington, IL (US); Jaswinder Singh, Dunlap, IL (US); Patrick Seiler, Peoria, IL (US); Eric Lee Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 115 days.

(21) Appl. No.: 17/675,151

(22) Filed: Feb. 18, 2022

(65) Prior Publication Data

US 2023/0265777 A1    Aug. 24, 2023

(51) Int. Cl.
| | |
|---|---|
| *F01P 3/08* | (2006.01) |
| *F01M 1/02* | (2006.01) |
| *F01P 7/14* | (2006.01) |
| *F02B 43/12* | (2006.01) |
| *F01P 3/00* | (2006.01) |

(52) U.S. Cl.
CPC .............. *F01P 3/08* (2013.01); *F01M 1/02* (2013.01); *F01P 7/14* (2013.01); *F02B 43/12* (2013.01); *F01P 2003/006* (2013.01); *F01P 2007/146* (2013.01)

(58) Field of Classification Search
CPC .......... F01P 3/08; F01P 7/14; F01P 2003/006; F01P 2007/146; F01M 1/02; F02B 43/12
See application file for complete search history.

(56) References Cited

U.S. PATENT DOCUMENTS

| | | |
|---|---|---|
| 8,739,746 B2 | 6/2014 | Bidner et al. |
| 9,453,439 B2 | 9/2016 | Bidner et al. |
| 9,670,831 B2 | 6/2017 | Hotta |
| 10,273,927 B2 | 4/2019 | Glugla |

(Continued)

FOREIGN PATENT DOCUMENTS

| | | |
|---|---|---|
| DE | 102014007537 A1 | 11/2015 |
| DE | 102015007455 | 12/2016 |

(Continued)

OTHER PUBLICATIONS

Written Opinion and International Search Report for Int'l. Patent Appln. No. PCT/US2022/080908, dated Apr. 5, 2023 (15 pgs).

*Primary Examiner* — Jacob M Amick
(74) *Attorney, Agent, or Firm* — Brannon Sowers & Cracraft PC

(57) ABSTRACT

Operating a gaseous fuel engine system includes combusting a mixture containing a gaseous hydrogen fuel and air in a cylinder of an engine, varying an operating parameter of the engine to which a crown surface temperature of a piston within the cylinder is responsive, and populating a temperature model based on a value of the varied operating parameter. Operating a gaseous fuel engine system further includes operating an oil spray apparatus to spray oil onto the piston based on the populated temperature model, and maintaining the crown surface temperature of the piston between a high temperature limit and a pre-ignition mitigation temperature limit based on the operating of the oil spray apparatus. Related apparatus and control logic is also disclosed.

19 Claims, 2 Drawing Sheets

(56) References Cited

U.S. PATENT DOCUMENTS

| | | | |
|---|---|---|---|
| 11,008,907 B2 | 5/2021 | Lee et al. | |
| 2016/0237877 A1* | 8/2016 | Sato | F01P 7/16 |
| 2017/0342891 A1* | 11/2017 | Ha | F01M 1/16 |
| 2021/0180539 A1* | 6/2021 | Noguchi | F01P 3/10 |

FOREIGN PATENT DOCUMENTS

| | | |
|---|---|---|
| DE | 102016225744 B4 | 7/2018 |
| JP | 5109634 B2 | 12/2012 |

* cited by examiner

OPTIMIZED PISTON TEMPERATURE CONTROL IN GASEOUS FUEL HYDROGEN ENGINE SYSTEM

STATEMENT OF GOVERNMENT INTEREST

This invention was made with government support under contract DE-EE0009422 awarded by DOE. The Government has certain rights in this invention.

TECHNICAL FIELD

The present disclosure relates generally to operating a gaseous hydrogen fuel engine system, and more particularly to maintaining a crown surface temperature of a piston between a high temperature limit and a pre-ignition mitigation temperature limit based on operating an oil spray apparatus for the piston.

BACKGROUND

Internal combustions are well known and widely used throughout the world for diverse purposes ranging from powering mobile vehicles to production of electrical power and compression or transfer of fluids. A conventional internal combustion engine operating technique includes delivering air and fuel into a combustion cylinder and controllably igniting the mixture therein to move a piston coupled to a crankshaft. Combustion of conventional liquid fuels, as well as gaseous hydrocarbon fuels, tends to produce a variety of undesired emissions including oxides of nitrogen or "NOx" as well as various organic and inorganic species of particulate matter. Most engines are equipped with aftertreatment apparatus to trap or chemically transform emissions.

In recent years, various alternative fuels have received increased attention. Certain alternative fuels, notably hydrogen, offer the promise of significantly reduced emissions. Hydrogen fuels differ from traditional hydrocarbon fuels in various ways, however, challenging engineers and combustion scientists with regard to adapting existing platforms or developing new platforms that practicably run on hydrogen. Hydrogen tends to have a faster flame speed than certain other fuels, but also burns at lower temperatures. Temperature control in all engine platforms has long provided an array of challenges, both with regard to efficiency and emissions and also respecting the capability of components to optimally operate. Moreover, different parts of an engine can require altogether different cooling apparatus and strategy. U.S. Pat. No. 5,267,534 to Berlinger discloses one example strategy for a piston cooling nozzle employing cooling jets for spraying oil to an underside of a piston during engine operation.

SUMMARY

In one aspect, a method of operating a gaseous fuel engine system includes combusting a mixture containing a gaseous hydrogen fuel and air in a cylinder of an engine in a gaseous fuel engine system, and varying an operating parameter of the engine to which a crown surface temperature of a piston within the cylinder is responsive. The method further includes populating a temperature model based on a value of the varied operating parameter, and operating an oil spray apparatus to spray oil onto the piston based on the populated temperature model. The method further includes maintaining the crown surface temperature of a piston between a high temperature limit and a pre-ignition mitigation temperature limit based on the operating of the oil spray apparatus.

In another aspect, a gaseous fuel engine system includes an engine having a cylinder formed therein, and a piston within the cylinder. The engine system further includes a fuel supply for the engine containing a gaseous hydrogen fuel, and an oil spray system. The oil spray system includes an oil sprayer jet oriented to spray oil onto the piston, an oil valve fluidly connected to the oil sprayer jet, and an oil spray control unit in control communication with the oil valve. The oil spray control unit is structured to monitor an operating parameter of the engine to which a crown surface temperature of a piston is responsive, and to determine an oil valve control signal based on a value of the monitored operating parameter. The oil spray control unit is further structured to output the oil valve control signal to the oil valve to controllably spray oil onto the piston to maintain the crown surface temperature between a high temperature limit and a pre-ignition mitigation temperature limit.

In still another aspect, an oil spray control system for a gaseous fuel engine system includes an oil spray control unit structured to receive data indicative of an operating parameter of an engine, and to determine an oil valve control signal by way of a stored temperature model linking a temperature of a piston in a cylinder in the engine to the operating parameter. The oil spray control unit is further structured to output the oil valve control signal to an oil valve for an oil sprayer jet to controllably spray oil onto the piston, such that a temperature of the piston is maintained above a pre-ignition mitigation temperature limit.

DETAILED DESCRIPTION

Figure 1:
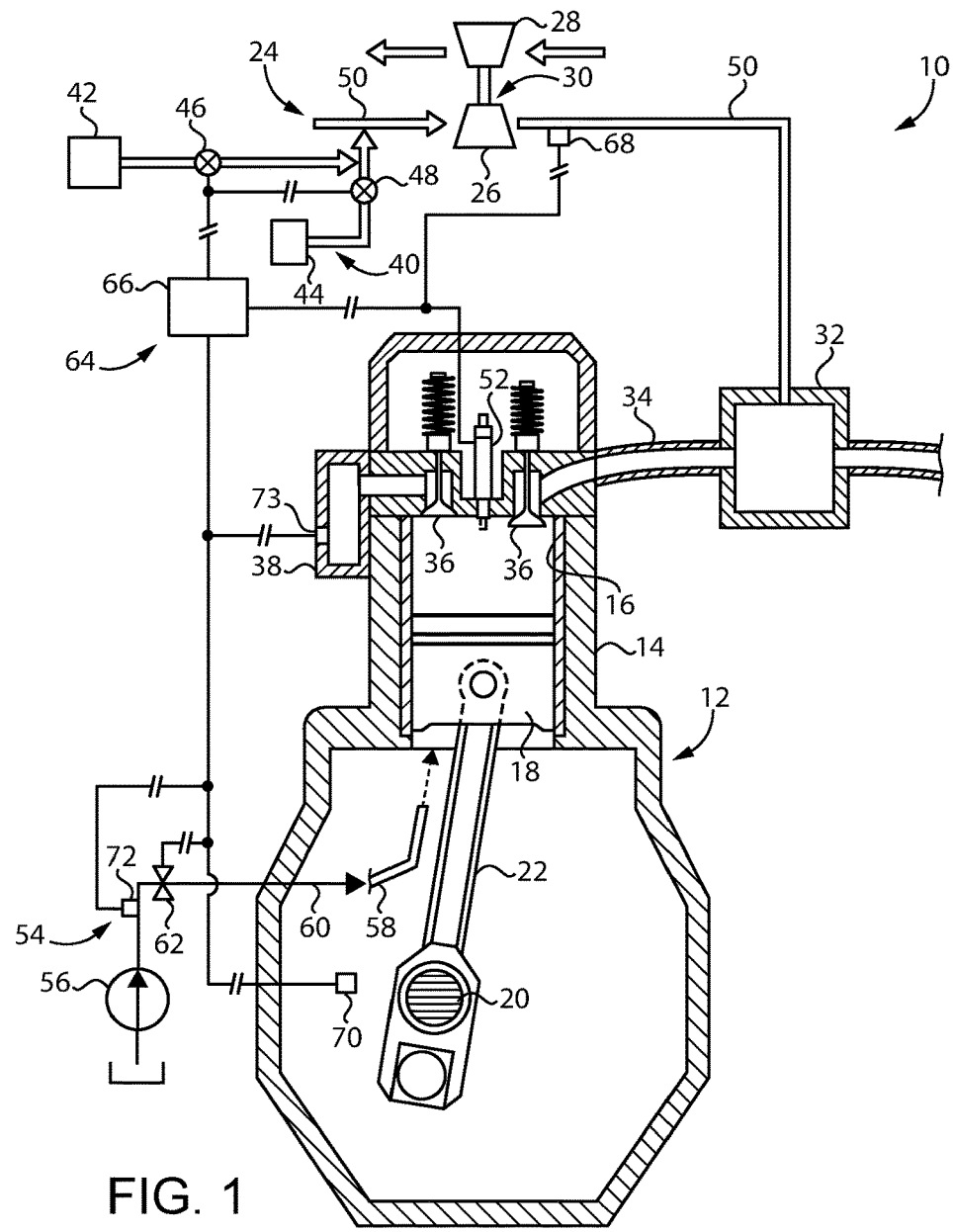
FIG. 1 is a diagrammatic view of a gaseous fuel engine system, according to one embodiment.

Referring to FIG. 1, there is shown a gaseous fuel engine system 10, according to one embodiment. Engine system 10 includes an engine 12 having an engine housing 14 including a combustion cylinder 16 formed therein, and a piston 18 within cylinder 16 and movable between a top dead center position and a bottom dead center position in a generally conventional manner. Engine 12 may operate in a conventional four-cycle pattern, although the present disclosure is not thereby limited. Piston 18 is coupled with a connecting rod 22, in turn coupled to a crankshaft 20. Engine system 10 further includes an intake system 24 having an intake conduit 50 extending to an intake manifold 32, and a compressor 26 of a turbocharger 30 positioned fluidly within intake conduit 50. An intake runner 34 extends to engine housing 14 to convey compressed intake air, and in the illustrated embodiment gaseous fuel, to combustion cylinder 16. An exhaust manifold 38 is also coupled to engine housing 14 and conveys a flow of exhaust to a turbine 28 of turbocharger 30. Piston 18 may be one of a plurality of pistons within a plurality of combustion cylinders in engine 12. The pistons may be of any number and arranged in any suitable configuration such as an in-line pattern, a V-pattern, or still another. Engine valves 36 are supported in engine housing 14 and movable to open and close fluid communication between cylinder 16 and intake manifold 32 and exhaust manifold 38, also in a generally conventional manner.

Engine system 10 further includes a fuel system 40. Fuel system 40 includes a first fuel supply 42 for engine 12 and a second fuel supply 44 for engine 12. First fuel supply 42 may contain a gaseous hydrogen fuel, for example compressed gaseous hydrogen or various blends, and fluidly connects to intake conduit 50 by way of a first fuel valve 46. Second fuel supply 44 may contain another fuel type, such as a gaseous hydrocarbon fuel, and fluidly connects to intake conduit 50 by way of a fuel valve 48. The gaseous fuel contained in fuel supply 44 could be methane, ethane, natural gas in a compressed gaseous state, or a cryogenically liquified state, to name a few examples. Fuel supply 44 could alternatively be a connection to line gas such as might be available at a well site, a landfill, or another site. In some embodiments, engine system 10 might nevertheless include a single-fuel engine operated on only gaseous hydrogen.

It will be appreciated that fuels supplied to intake conduit 50 are fumigated in the illustrated embodiment. In other instances, gaseous hydrogen fuel, gaseous hydrocarbon fuel, or both, could be admitted downstream of compressor 26 instead of upstream as shown. For instance, gaseous hydrogen fuel or gaseous hydrocarbon fuel could be delivered by way of an admission valve connecting to intake runner 34, connecting to intake manifold 32, or to a direct fuel injector associated with cylinder 16. Also shown supported in engine housing 14 is a sparkplug 52 having a spark gap positioned within cylinder 16. In some embodiments, sparkplug 52 may be configured as a prechamber sparkplug. In still other embodiments, engine system 10 could be a dual liquid and gaseous fuel engine where ignition of a gaseous fuel charge is caused by compression-ignition of a relatively small liquid pilot fuel charge directly injected. It will be appreciated the present disclosure is not limited with regard to locations of fuel delivery or ignition strategy. Each of fuel valve 46 and fuel valve 48 can be electrically actuated and is coupled with an electronic control unit 66 further discussed herein.

Engine system 10 further includes an oil spray apparatus or system 54. Oil spray system 54 includes an oil pump 56, and an oil conduit 60 extending from oil pump 56 to an oil sprayer jet 58. Oil sprayer jet 58 is oriented to spray oil onto an underside of piston 18. In an implementation each of a plurality of pistons in engine system 10 is associated with an oil sprayer jet all fed by a common oil conduit. Description herein of piston 18 or cylinder 16 in the singular can be understood to refer to any of the plurality of pistons or cylinders. An oil valve 62 is fluidly connected to oil sprayer jet 58 and is electrically actuated. Oil spray system 54 further includes an oil spray control system 64. Electronic control unit 66 may be understood as an oil spray control unit that is the same as, part of, or electrically connected to, an engine control unit. Thus, oil spray control unit 66 may be tasked with monitoring and controlling various parts of engine system 10 and in control communication with fuel valve 46, fuel valve 48, and sparkplug 52, as well as oil pump 56 and oil valve 62.

Oil spray control system 64 may further include various sensors structured to monitor operating parameters of engine 12. The sensors can include but are not limited to an intake pressure sensor 68, an engine speed sensor 70, an oil pressure sensor 72, and an oxygen sensor or lambda sensor 73 coupled to exhaust manifold 38. Oil spray control unit 66 may be structured to monitor an operating parameter of engine 12 to which a crown surface temperature of piston 18 is responsive. The "crown surface" of piston 18 may include parts of piston 18 understood as surfaces of a piston crown, including a combustion face of piston 18 exposed to cylinder 16 and an adjacent rim surface. Oil spray control unit 66 thus receives data from one or more of the various sensors indicative of an operating parameter of engine 12. The operating parameter to which a crown surface temperature of piston 18 is responsive may include one or more of a load level of engine 12, an engine speed, or a composition of a mixture containing gaseous hydrogen fuel and air and potentially also gaseous hydrocarbon fuel combusted in cylinder 16. Composition means a relative or actual gaseous hydrogen content, a relative or actual gaseous hydrocarbon content, a substitution ratio of hydrogen to hydrocarbon, a relative or actual oxygen content, and/or potentially still other compositional properties such as a recirculated exhaust content.

Oil spray control unit 66 may be further structured to determine an oil valve control signal based on a value of the monitored operating parameter, such as a numerical value or a sign (+ or −) of the monitored operating parameter. Determining the oil valve control signal may include looking up a control signal valve or a value of a parameter to be controlled, or performing a calculation, for example. Oil spray control unit 66 may be further structured to output the oil valve control signal to oil valve 62 to controllably spray oil onto piston 18 to maintain the crown surface temperature between a high temperature limit and a pre-ignition temperature limit.

Pre-ignition in a cylinder in a gaseous fuel engine combusting gaseous hydrogen as the sole fuel or in a blend can sometimes occur, potentially compromising efforts at controlling combustion phasing, limiting certain emissions, and/or leading to undesired stress on engine hardware. Deposits of oil-derived carbon material upon a crown surface of a piston exposed to a cylinder may trigger pre-ignition of a charge containing gaseous hydrogen fuel. Small particles or portions of the deposits may, at times, dislodge and effectively form a spark that causes the gaseous hydrogen fuel to ignite at an undesired timing. Other root causes of pre-ignition may exist, however. When crown surface temperatures are above a certain threshold temperature (the pre-ignition mitigation temperature limit) pre-ignition may be less likely to occur, due to reduced likelihood of deposit formation or potentially some other factor. Thus, controllably maintaining temperatures above a pre-ignition mitigation temperature limit can reduce the extent to which pre-ignition occurs or eliminate pre-ignition entirely. There are also upper limits in temperature (the high temperature limit) above which material of a piston or other engine structures can experience failure or performance degradation. An appropriate high temperature limit is known or readily determinable for materials used in engine component construction, including irons, steels, stainless steel, aluminum, and others. A suitable pre-ignition mitigation temperature limit can be determined empirically by conventional techniques.

As will be further apparent from the following description, by controllably spraying oil onto an underside of piston 18 crown surface temperatures can be maintained in a zone or range where pre-ignition is reduced or non-existent but temperature limits of the piston material are also not exceeded. The dynamic environment in a cylinder in an operating engine, however, can result in varying piston temperatures based upon a number of different factors, including variables that are cross-coupled. As noted above, oil spray control unit 66 monitors one or more operating parameters of an engine to which a crown surface temperature of piston 18 is responsive. Changes in fuel type, changes in ratio of one fuel type to another fuel type such as a ratio of gaseous hydrogen fuel to gaseous hydrocarbon fuel, engine speed, engine load, oxygen content, and various other factors can all influence a piston crown surface temperature at any given time. Thus, a crown surface temperature of piston 18 may be responsive, at least at times, to different operating parameters to different relative extents and in relatively complex ways.

Figure 2:
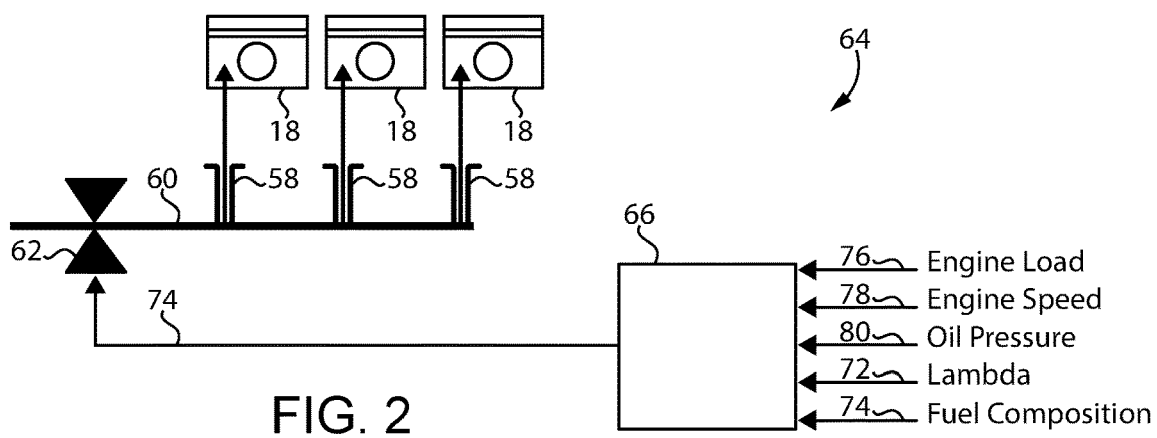
FIG. 2 is a diagrammatic view of an oil spray system, according to one embodiment.

Referring also now to FIG. 2, oil spray control unit 66 maintains the crown surface temperature of piston 18 between the high temperature limit and the pre-ignition mitigation temperature limit by way of a stored dynamic temperature model. As can be seen in FIG. 2 a plurality of oil sprayer jets 58 are each positioned to discharge oil in a direction of one of a plurality of pistons understood to be positioned in a plurality of cylinders in engine 12. Oil spray control unit 66 can vary the position of oil valve 62 to vary a flow of oil from oil pump 56 to the plurality of oil sprayer jets 58 each oriented to spray oil at respective undersides of pistons 18. Sprayed oil can enter a piston cooling gallery with openings in the piston underside if the pistons are thusly constructed. Oil pump 56 may be a fixed displacement pump, thus varying a position of oil valve 62 can vary the flow rate of oil that is sprayed at pistons 18. As can also be seen in FIG. 2 oil spray control unit 66 receives a plurality of different inputs each corresponding to a monitored operating parameter to which a crown surface temperature of piston 18 is responsive. The inputs can include an engine load level input 76, an engine speed input 78, a lambda input 82, and a fuel composition input 84. Oil spray control unit 66 may also receive an oil pressure input. Based on at least one of, typically at least two, and potentially all of the respective inputs, oil spray control unit 66 populates a temperature model based on the operating parameters, including values of the operating parameters when varied. The stored temperature model can be empirically derived, produced by way of simulation, or combinations of these. Within the stored temperature model, a crown surface temperature, or another temperature, of piston 18 is linked to values of the one or more operating parameters such as by way of one or more stored maps. Oil spray control unit 66 can include any suitable programmable logic controller, such as a microprocessor or a microcontroller, and a suitable computer readable memory storing the temperature model and program instructions for operating oil spray system 54, such as RAM, ROM, DRAM, SDRAM, FLASH, or still another.

Figure 3:
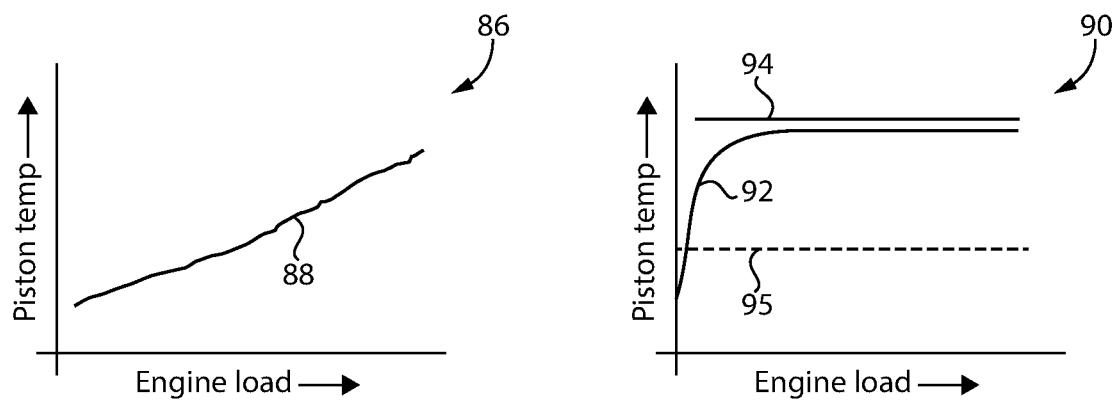
FIG. 3 includes graphs relating piston temperature and engine load for a known strategy in comparison to one embodiment.

Referring also now to FIG. 3, it will be recalled that piston crown surface temperature may be responsive to engine load level. Engine load level can be estimated by way of various sensor inputs in a well-known manner. In a typical engine configuration and operating strategy piston crown surface temperature can be expected to scale roughly linearly with engine load. In the left graph 86 of FIG. 3 a line 88 shows the generally expected increase in piston crown surface temperature that can be expected with an increase in engine load. In the right graph 90 it can be seen that a line 92 representing piston crown surface temperature is quite different. Whereas in the typical temperature dependent relationship shown in graph 86 crown surface temperature scales roughly linearly with load, in graph 90 it can be seen that crown surface temperature does not linearly scale with engine load. Thus, oil spray control unit 66 can be understood as de-linearizing dependency of crown surface temperature upon load level by way of operating oil spray system 54. Also shown in graph 90 is a line 94 that represents the high temperature limit and a line 95 representing the pre-ignition temperature limit. It can be seen that crown surface temperature 92 is maintained between the high temperature limit 94 and pre-ignition mitigation temperature limit 95, by increasing or decreasing crown surface temperature according to an asymptotic curve having as an asymptote the high temperature limit. "Asymptotic" means generally of, or relating to, an asymptote. As engine load level increases toward a rated load line 92 might become parallel or close to parallel to high temperature limit 94, for example. In this way, the present disclosure can be understood as maintaining piston 18 and its crown surface as hot as practicable by modulating oil spray without getting so hot that material limitations are exceeded.

INDUSTRIAL APPLICABILITY

Figure 4:
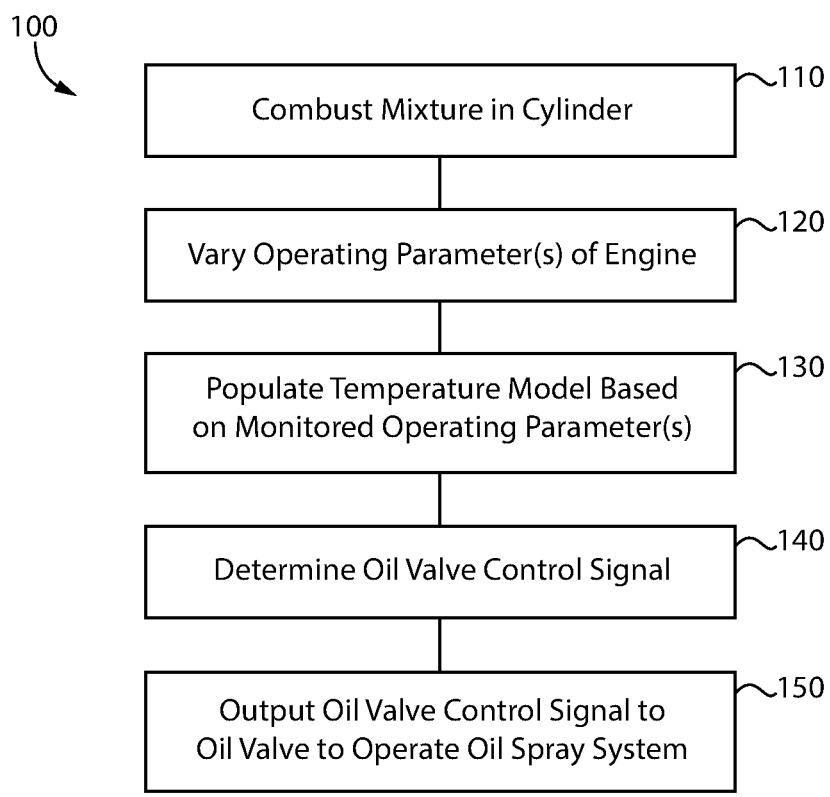
FIG. 4 is a flowchart illustrating example methodology and logic flow, according to one embodiment.

Referring also now to FIG. 4, there is shown a flowchart 100 illustrating example methodology and logic flow, according to one embodiment. At a block 110 a mixture containing a gaseous hydrogen fuel and air, and potentially also a gaseous hydrocarbon fuel, is combusted in cylinder 16 of engine 12 in engine system 10. From block 110 flowchart 100 advances to a block 120 to vary operating parameter(s) of engine 10 to which crown surface temperature of piston 18 within cylinder 16 is responsive. From block 120 flowchart 100 advances to a block 130 to populate the temperature model based on a value of the monitored operating parameter(s). Populating the temperature model can be understood as updating stored values indicated by inputs 76, 78, 80, 82, and 84 as depicted in FIG. 2.

From block 130 flowchart 100 advances to a block 140 to determine the oil valve control signal. In FIG. 2 the oil valve control signal is shown at 74, and may include an electrical control current signal to a solenoid, for example, that causes a change to a position of electrically actuated oil valve 62. From block 140, oil valve control signal 74 is outputted to operate oil spray system 54, increasing, decreasing, or maintaining a temperature of piston 18 and the crown surface thereof.

It has been observed that changes in engine load level and changes in fuel composition, such as switching between natural gas and hydrogen, or varying a blend ratio between natural gas and hydrogen, can cause changes in piston crown surface temperature that can be associated with pre-ignition, potentially based on deposit formation, or result in exceeding temperature limits of the piston material. Accordingly, the present disclosure can be understood as increasing or decreasing oil spray dependent upon the various factors influencing crown surface temperature to avoid exceeding temperature limits as well as avoiding cooling to a point at which pre-ignition or other combustion phasing problems are observed.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly started otherwise.

What is claimed is:

1. A method of operating a gaseous fuel engine system comprising:
combusting a mixture containing a gaseous hydrogen fuel and air in a cylinder of an engine in the gaseous fuel engine system;
varying an at least one operating parameter of the engine to which a crown surface temperature of a piston within the cylinder is responsive;
populating a temperature model based on a value of the varied at least one operating parameter;
operating an oil spray apparatus to spray oil onto the piston based on the populated temperature model;
maintaining the crown surface temperature of the piston between a high temperature limit and a pre-ignition mitigation temperature limit based on the operating of the oil spray apparatus; and
wherein the varying an at least one operating parameter includes varying a ratio of the gaseous hydrogen fuel to a hydrocarbon fuel in the mixture containing the gaseous hydrogen fuel and air.

2. The method of claim 1 wherein the varying an a least one operating parameter includes varying a load level of the engine.

3. The method of claim 2 further comprising de-linearizing dependency of the crown surface temperature upon the load level by way of the operating an oil spray apparatus.

4. The method of claim 3 wherein the maintaining the crown surface temperature further includes increasing or decreasing the crown surface temperature according to an asymptotic curve.

5. The method of claim 1 wherein the varying an at least one operating parameter includes varying a fuel blend composition of the mixture containing the gaseous hydrogen fuel and air.

6. The method of claim 5 wherein the varying an at least one operating parameter includes varying a ratio of the gaseous hydrogen fuel to a gaseous hydrocarbon fuel in the mixture containing the gaseous hydrogen fuel and air.

7. The method of claim 1 wherein the operating the oil spray apparatus includes varying a position of an oil valve fluidly connected to an oil sprayer jet oriented to spray oil at an underside of the piston.

8. The method of claim 7 wherein the piston is one of a plurality of pistons in a plurality of cylinders in the engine, and the operating the oil spray apparatus further includes varying the position of the oil valve to vary a flow of oil from a fixed displacement oil pump to a plurality of oil sprayer jets oriented to spray oil at respective undersides of the plurality of pistons.

9. The method of claim 1 wherein:
the varied at least one operating parameter is one of a plurality of varied operating parameters; and
the populating of the temperature model includes populating the temperature model based on values of each of the plurality of operating parameters.

10. The method of claim 9 wherein the plurality of varied operating parameters includes at least two of engine load level, engine speed, hydrogen content of the mixture, and oxygen content of the mixture.

11. A gaseous fuel engine system comprising:
an engine having a cylinder formed therein, and a piston within the cylinder;
a first fuel supply for the engine containing a gaseous hydrogen fuel;
a second fuel supply for the engine containing a gaseous hydrocarbon fuel;
an oil spray system including an oil sprayer jet oriented to spray oil onto the piston, an oil valve fluidly connected to the oil sprayer jet, and an oil spray control unit in control communication with the oil valve;
the oil spray control unit is structured to:
monitor an operating parameter of the engine to which a crown surface temperature of the piston is responsive;
determine an oil valve control signal based on a value of the monitored operating parameter; and
output the oil valve control signal to the oil valve to controllably spray oil onto the piston to maintain the crown surface temperature between a high temperature limit and a pre-ignition mitigation temperature limit.

12. The engine system of claim 11 wherein the operating parameter includes one of a load level of the engine, an engine speed, or a composition of a mixture containing the gaseous hydrogen fuel combusted in the cylinder.

13. The engine system of claim 12 wherein the oil spray control unit is further structured to determine the oil valve control signal based on a dynamic temperature model.

14. The engine system of claim 13 wherein the oil spray control unit is further structured to:
monitor each of engine load level, engine speed, and composition of a mixture containing the gaseous hydrogen fuel combusted in the cylinder;
populate the dynamic temperature model based on the monitored engine load level, engine speed, and composition of a mixture containing the gaseous hydrogen fuel combusted in the cylinder.

15. The engine system of claim 14 wherein the monitored composition of the mixture includes a gaseous hydrogen content of the mixture.

16. An oil spray control system for a gaseous fuel engine system comprising:
an oil spray control unit structured to:
receive data indicative of an operating parameter of an engine;
determine an oil valve control signal by way of a stored temperature model linking a temperature of a piston in a cylinder in the engine to the operating parameter; and
output the oil valve control signal to an oil valve for an oil sprayer jet to controllably spray oil onto the piston, such that oil spray from the oil valve is decreased to maintain a temperature of the piston above a pre-ignition mitigation temperature limit.

17. The oil spray control system of claim 16 wherein the operating parameter includes a load level of the engine.

18. The oil spray control system of claim 17 wherein the oil spray control unit is further structured by way of the oil valve control signal to de-linearize dependency of the temperature of the piston upon the load level of the engine.

19. The oil spray control system of claim 17 wherein the stored temperature model links a crown surface temperature of the piston to engine speed, and to a composition of a mixture containing gaseous hydrogen fuel combusted in the cylinder.

\* \* \* \* \*